US012792830B2

(12) United States Patent
Taylor

(10) Patent No.: US 12,792,830 B2
(45) Date of Patent: Nov. 10, 2026

(54) LABELED KNOWLEDGE GRAPH BASED PRIMING OF A NATURAL LANGUAGE MODEL PROVIDING USER ACCESS TO PROGRAMMATIC FUNCTIONALITY THROUGH NATURAL LANGUAGE INPUT

(71) Applicant: Microsoft Technology Licensing, LLC, Redmond, WA (US)

(72) Inventor: John Anthony Taylor, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 915 days.

(21) Appl. No.: 18/148,431

(22) Filed: Dec. 29, 2022

(65) Prior Publication Data

US 2023/0141200 A1 May 11, 2023

Related U.S. Application Data

(63) Continuation of application No. 17/504,029, filed on Oct. 18, 2021, now Pat. No. 11,580,302, which is a continuation of application No. 16/854,833, filed on Apr. 21, 2020, now Pat. No. 11,151,320.

(51) Int. Cl.
*G06F 40/279* (2020.01)

(52) U.S. Cl.
CPC .................................. *G06F 40/279* (2020.01)

(58) Field of Classification Search
CPC .... G06F 40/279; G06F 16/3344; G06F 40/30; G06F 9/451
USPC .............................................................. 704/9
See application file for complete search history.

(56) References Cited

U.S. PATENT DOCUMENTS

2018/0121500 A1* 5/2018 Reschke ............. G06F 16/2428
2020/0057946 A1* 2/2020 Singaraju ............... G06N 5/022

OTHER PUBLICATIONS

Communication pursuant to Article 71(3) EPC, Received for European Application No. 21712628.3, mailed on Jul. 10, 2024, 6 pages.
Decision to Grant Received for European Application No. 21712628.3, mailed on Nov. 7, 2024, 2 pages.
Communication under Rule 71(3) EPC, Received for European Application No. 21712628.3, mailed on Feb. 21, 2024, 08 pages.

* cited by examiner

*Primary Examiner* — Thierry L Pham

(57) ABSTRACT

A natural language model can be primed utilizing optimized examples generated from a labeled knowledge graph corresponding to an independently developed application program. Parsing of the labeled knowledge graph can include the identification of triples, comprising a source node, a destination node, and a link between them, each of which can be labeled. One or more natural language input examples can be generated from an individual triple by concatenating the natural language words or phrases utilized to label the source node in the link. Determinations that subsequently received natural language user input is similar to the generated examples can result in an identification of the triple, which can, in turn, trigger the performance of a function associated with the destination node of the triple. Labels can include preferred labels and alternative labels, and various permutations thereof can be concatenated to generate alternative natural language input examples.

20 Claims, 7 Drawing Sheets

LABELED KNOWLEDGE GRAPH BASED PRIMING OF A NATURAL LANGUAGE MODEL PROVIDING USER ACCESS TO PROGRAMMATIC FUNCTIONALITY THROUGH NATURAL LANGUAGE INPUT

CROSS-REFERENCE TO RELATED APPLICATION

This application is a continuation of and claims priority to U.S. patent application Ser. No. 17/504,029 filed on Oct. 18, 2021 entitled "LABELED KNOWLEDGE GRAPH BASED PRIMING OF A NATURAL LANGUAGE MODEL PROVIDING USER ACCESS TO PROGRAMMATIC FUNCTIONALITY THROUGH NATURAL LANGUAGE INPUT" which is a continuation of and claims priority to U.S. patent application Ser. No. 16/854,833 filed on Apr. 21, 2020 (now U.S. Pat. No. 11,151,320) entitled "LABELED KNOWLEDGE GRAPH BASED PRIMING OF A NATURAL LANGUAGE MODEL PROVIDING USER ACCESS TO PROGRAMMATIC FUNCTIONALITY THROUGH NATURAL LANGUAGE INPUT", the disclosures of which are hereby incorporated by reference in their entireties.

BACKGROUND

Modern computer software application programs enable the user to access the functionality of such application programs through a variety of computer user interface mechanisms. One such computer/user interface mechanism can be a text-based interface, commonly referred to as a Command Line Interface (CLI). Another computer/user interface mechanism can be a graphics-based interface, commonly referred to as a Graphical User Interface (GUI). Increasingly, natural language user interface mechanisms are provided to enable a user to interact with, and access the functionality of, application programs. Such natural language user interface mechanisms allow users to speak, type, write or otherwise provide input to an application program, utilizing terminology, wording and phrasing in the same manner as they would to another human. Thus, rather than requiring the user to learn an archaic command, or find their way around drop-down menus, a natural language user interface mechanism allows the user to access functionality of a computer application program in a manner that is linguistically more natural to the user.

Often, natural language user interface mechanisms are supported by an existing, pre-trained natural language model. Such an existing natural language model can already understand various idioms of human speech and can recognize, for example, that the concept of population can be linguistically expressed utilizing phrasing such as "the number of people who live in", "the population of", "how many people are in", and other like phrasing. However, such existing natural language models still need to be primed in order to provide access to the specific functionality offered by specific application programs. For example, an application program providing home automation control can receive different types of natural language commands then an application program providing geographic information. Typically, to prime an existing natural language model, the developer of an application program can provide multiple examples of natural language input that invokes a specific function of the application program. A user natural language input is then compared to the provided examples utilizing the existing natural language model as a basis for the comparison. Whichever example is closest, within the context of the existing natural language model, to the received user natural language input, determines which functionality of the application program is associated with the received user natural language input.

Unfortunately, the examples provided are often suboptimal since the existing natural language model is typically developed independently of the application program seeking to utilize such an existing natural language model in order to enable the application program to receive and process natural language input. Thus, developers of application programs often provide natural language input examples that provide a suboptimal priming, which can, in turn, degrade the overall natural language input processing performance, since users' natural language inputs will be compared against those suboptimal examples. Additionally, examples from one domain can overlap, and cause ambiguity, with examples from another domain, which can be especially significant in instances where application programs are constructed from reusable components, which may, themselves, be developed independently of the application programs within which they are utilized. For example, one component can provide its own examples which can conflict with the examples provided by another, different component, and those examples can both be in conflict with the examples provided by an application developer of the overall application program that utilized both components. Such overlap, ambiguity and sub-optimality is exacerbated by the use of casual and informal language in examples. In particular, casual and informal language can be imprecise and ambiguous. For example, in informal language, it can be common to use similar terminology to describe the weather as to describe a human's emotional state.

SUMMARY

To optimize the utilization of an existing natural language model in providing natural language input functionality to independently developed application programs, the natural language model can be primed utilizing optimized natural language input examples generated from a labeled knowledge graph corresponding to an independently developed application program. The knowledge graph can be labeled by developers of the independently developed application program and can be provided to an example generator, which can be designed to parse the labeled knowledge graph, and generate therefrom, natural language input examples that will most effectively prime the existing natural language model such that subsequent comparisons of user natural language input to such examples will provide increased accuracy in invoking application program functionality through natural language user input. Parsing of the labeled knowledge graph can include the identification of triples, comprising a source node, a destination node, and a link between them, each of which can be labeled. One or more natural language input examples can be generated from an individual triple by concatenating the natural language words or phrases utilized to label the source node in the link. Such natural language input examples can then be associated with the triple and can provide a source of comparison for subsequent natural language user input. Determinations that subsequently received natural language user input is similar to the generated examples can result in an identification of the triple, which can, in turn, trigger the performance of a function associated with the destination node of the triple. Labels can include preferred labels and alternative labels, and various permutations thereof can be concatenated to generate alternative natural language input examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
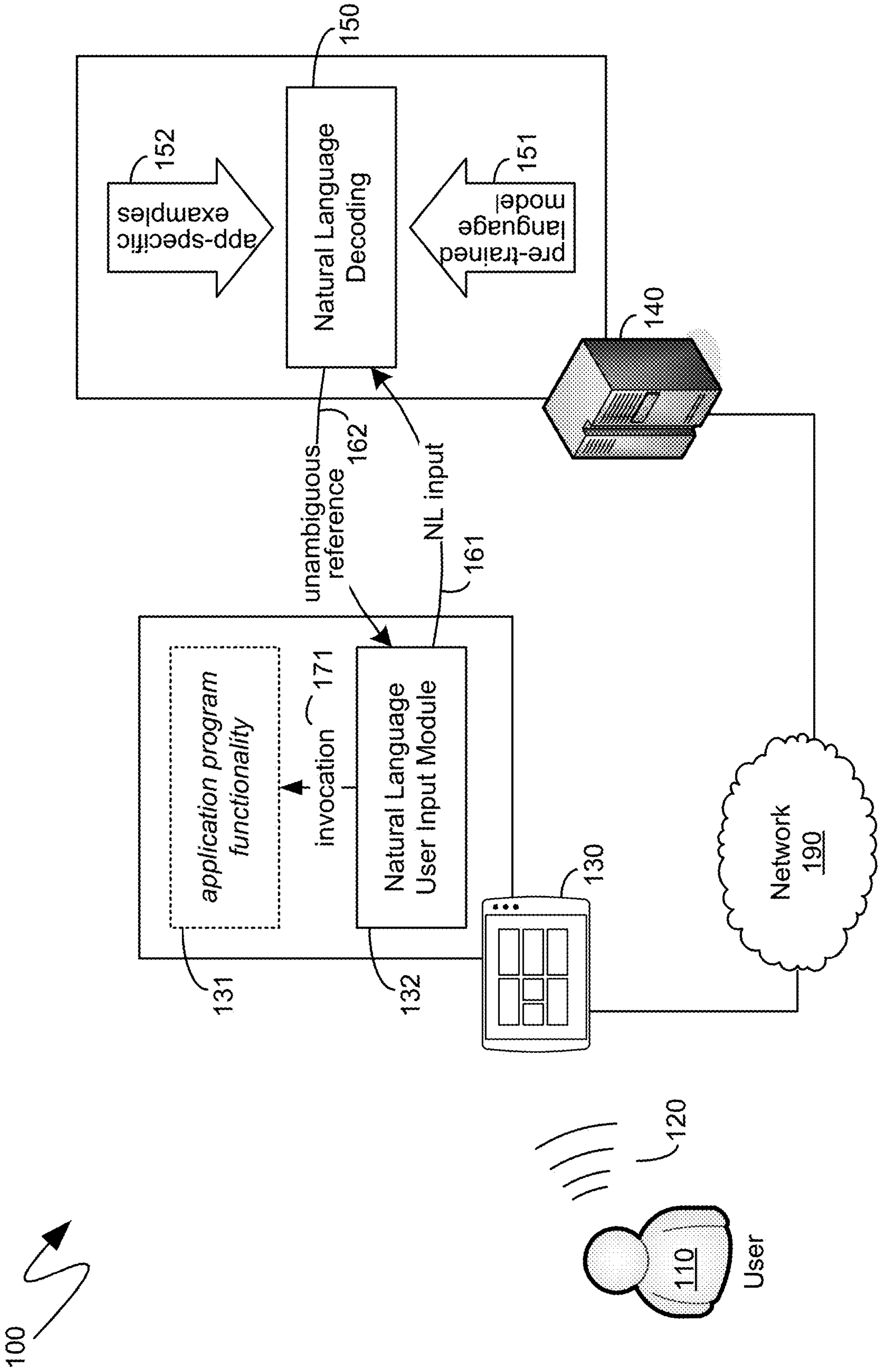
FIG. 1 is a system diagram of an exemplary system for utilizing an existing natural language model to provide natural language input functionality to an independently developed application program.

The following description relates to optimizing the utilization of an existing natural language model to provide natural language input functionality to independently developed application programs. Such optimization includes the priming of the natural language model utilizing optimized natural language input examples generated from a labeled knowledge graph that corresponds to an independently developed application program. The knowledge graph can be labeled by developers of the independently-developed application program and can be provided to an example generator, which can be designed to parse the labeled knowledge graph, and generate therefrom, natural language input examples that will most effectively prime the existing natural language model such that subsequent comparisons of user natural language input to such examples will provide increased accuracy in invoking application program functionality through natural language user input. Parsing of the labeled knowledge graph can include the identification of triples, comprising a source node, a destination node, and a link between them, each of which can be labeled. One or more natural language input examples can be generated from an individual triple by concatenating the natural language words or phrases utilized to label the source node in the link. Such natural language input examples can then be associated with the triple, and can provide a source of comparison for subsequent natural language user input. Determinations that subsequently received natural language user input is similar to the generated examples can result in an identification of the triple, which can, in turn, trigger the performance of a function associated with the destination node of the triple. Labels can include preferred labels and alternative labels, and various permutations thereof can be concatenated to generate alternative natural language input examples.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, programmable consumer electronics, network PCs, Internet of Things (IoT), and the like. Similarly, the computing devices need not be limited to stand-alone computing devices, as the mechanisms are also practicable in distributed computing environments where tasks are performed by one or more remote processing devices, working in either series or parallel, that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates a user 110 utilizing a computing device 130 to invoke functionality 131 offered by the computing device 130. For example, the computing device 130 can be an information presenting device which can provide answers to user queries. As another example, the computing device 130 can be a home control and automation device. Other like computing devices are equally utilizable with the mechanisms described herein.

For ease of user interaction, the computing device 130 can offer natural language input processing so that the user 110 can invoke functionality of the computing device 130 utilizing natural language input. For example, the user 110 can speak a natural language input question or command, such as the exemplary user speech 120, to which the computing device 130 can meaningfully respond. Alternatively, or in addition, the user can type, write, or otherwise input natural language phrasing and wording into the computing device 130. For example, the user 110 may seek to learn the population of New York City. Accordingly, the user 110 can phrase a natural language input question, such as in the form of: "how many people live in New York City?" As another example, the user 110 may seek to have the computing device 130 control a heating device, such as by phrasing a natural language input command in the form of "turn up the heat."

According to one aspect, rather than creating natural language input processing for each application program, application program developers can leverage a pre-existing natural language model. Such an existing natural language model can be independently created and curated, and can represent functionality and capability that would be difficult or impractical for an application program developer to create on their own. For example, an existing language model can be based on vast quantities of natural language input in order to recognize equivalence among colloquial expressions, common phrasing, and other like natural language subtleties. Such vast quantities of natural language input can include, for example, hundreds of thousands, or even millions of, newspaper articles, published speeches, encyclopedic entries, or other like natural language input. Typically, machine learning can be applied to such vast quantities of natural language input in order to derive some or all of the existing natural language model. In such a manner, an existing natural language model can understand various idioms of human speech and can recognize, for example, that the concept of population can be linguistically expressed utilizing phrasing such as "the number of people who live in", "the population of", "how many people are in", and other like phrasing.

Turning back to the exemplary system 100 of FIG. 1, application programs executing on a computing device, such as the exemplary computing device 130, can utilize existing natural language models, such as the exemplary pre-trained language model 151, through network communications with one or more server computing devices, such as the exemplary server computing device 140, which can be communicationally coupled to the exemplary computing device 130 via the network 190. An application program executing on the exemplary computing device 130 can include a natural language user input module, such as the exemplary natural language user input module 132, which can interface with hardware and/or software mechanisms by which the exemplary computing device 130 can receive natural language user input. Natural language user input can be provided through a microphone that can receive the voice input 120, a keyboard that can receive typed input, a touchpad and stylus that can receive written input, and other like hardware and/or software mechanisms.

Upon receiving the natural language user input, the natural language user input module 132 can communicate the natural language input 161 to a natural language decoding component, such as the exemplary natural language decoding component 150. The natural language decoding component 150 can utilize an existing natural language model, such as the pre-trained language model 151, to analyze the natural language input 161. More specifically, and as will be detailed further below, the pre-trained language model 151 can form a basis by which the natural language input 161 is compared with examples, such as the examples 152, that correspond to specific functions provided by the application program functionality 131.

Once the natural language input 161 is determined, by the natural language decoding component 150, to be a request for a particular function provided by the application program functionality 131, an unambiguous reference 162 to such an application program function can be returned, such as to the natural language user input module 132. The natural language user input module 132 can then invoke the appropriate function, from among the application program functionality 131, as illustrated by the invocation action 171.

Although illustrated in FIG. 1 as executing on specific computing devices, various aspects and components of the exemplary system 100 can execute on computing devices different than those illustrated without departing from the context of the descriptions provided herein. For example, aspects of the application program functionality 131 can be executed on one or more remote computing devices and can work in concert with processes executing locally on the computing device 130. As another example, aspects of the natural language decoding 150, or the entirety of the natural language decoding 150, can be performed locally on the computing device 130.

Additionally, the exemplary computing device 130 can be an appliance, or specific-purpose, computing device, such as a smart thermostat, a voice-controlled light switch, a programmable remote, or other like specific-purpose computing device. In such an instance, the application program functionality 131 can be provided by preinstalled application programs. Conversely, the exemplary computing device 130 can be a general-purpose computing device, such as a desktop computing device, a laptop computing device, a tablet computing device, smart phone computing device, and other like general-purpose computing devices. In such an instance, the application program functionality 131 can generally represent the functionality provided by one or more application programs, including user-installed application programs. The natural language user input module 132 can be a component of individual application programs, such that one application program can have its own natural language user input module that can be independent of the natural language user input module of another, different application program. Alternatively, or in addition, the natural language user input module 132 can be an operating system component, or other like shared component that can be equally utilized by different applications or different processes executing on the exemplary computing device 130.

As indicated previously, the natural language decoding component 150 can process natural language input, such as the exemplary natural language input 161, based on an existing natural language model, such as the exemplary pre-trained language model 151, which can form a basis by which the natural language input 161 is compared with examples, such as the examples 152. More specifically, statistical analysis, or other like forms of comparison, can be utilized by the natural language decoding component 150 to evaluate the statistical equivalence, closeness in a multidimensional data space, or other like measure of similarity between a received natural language input, such as the exemplary natural language input 161, and the examples 152, in view of the pre-trained language model 151. By way of a simple example, a natural language input of the form "how many people are in New York?" can be determined, by the natural language decoding component 150, to be more similar to an example of the form "what is the population of New York?" than to an example of the form "how many people are in Rochester?", based upon the pre-trained language model 151. In such a simple example, the pre-trained language model 151 can comprise information that the phrase "how many people are in" carries an equivalent meaning to the phrase "what is the population of". As such, even though the natural language input "how many people are in New York?" has more words that are similar to the example "how many people are in Rochester?" than to the example "what is the population of New York?", the natural language decoding component 150 can utilize the above identified semantical equivalence, provided by the pre-trained language model 151, to determine that the natural language input "how many people are in New York?" is more similar to the example "what is the population of New York?" than to the example "how many people are in Rochester?" Based upon such a determination, the natural language decoding component 150 can provide an unambiguous reference 162 to the function, or aspect, of the application program functionality 131 that is associated with the example "what is the population of New York?" For example, the natural language decoding component 150 can provide an unambiguous reference 162 to an aspect of the application program functionality 131 that can cause the device 130 to display the information "8,000,000" as a response to the natural language user input of "how many people are in New York?"

As can be seen from the above description, the ability of the natural language decoding component 150 to accurately correlate natural language user input to a specific function or aspect of the application program functionality is dependent upon the degree to which the examples 152, provided for each function or aspect of the application program functionality that is to be invocable utilizing natural language user input, match up with the knowledge or structure of the pre-trained language model 151. As such, examples formed without reference to the pre-trained language model 151 can introduce confusion or ambiguity in the decoding performed by the natural language decoding component 150. For example, if multiple examples are provided for a single function in order to provide alternative phrasing by which such a function might be invoked by a natural language input, but such multiple examples use alternative phrasing that is in conflict with alternative phrasing deemed by the pre-trained language model 151 to convey the same concept, then such multiple examples can potentially result in confusion and even an inability of the natural language decoding component 150 to accurately generate an unambiguous reference to that function for certain types of natural language user input that the user 110 would utilize to invoke that function. As a result, the user 110 may experience dissatisfaction or annoyance at the computing device 130 not correctly invoking the function the user intended with the natural language user input.

Moreover, as indicated, examples from different domains can overlap with one another and cause further ambiguity and/or sub-optimality. Such can be especially significant in instances where application programs are constructed from reusable components, which may, themselves, be developed independently of the application programs within which they are utilized. As such, one component can provide its own examples which can conflict with the examples provided by another, different component, and those examples can both be in conflict with the examples provided by an application developer of the overall application program that utilizes both components. Such overlap, ambiguity and sub-optimality is exacerbated by the use of casual and informal language in examples. In particular, casual and informal language can be imprecise and ambiguous.

To provide examples, such as the examples 152, which can act as references to which the natural language decoding component 150 compares natural language user input in order to determine which function, or aspect of the application program functionality 131, should be invoked in response to the user's natural language input, an example generator can be utilized that can be tuned in accordance with the pre-trained language model 151 such that the examples generated by such an example generator can optimally be utilized with the pre-trained language model 151 and not cause confusion, but rather enable the natural language decoding component 150, utilizing the pre-trained language model 151, to more easily and more accurately correlate natural language user input to a single example, and, thus, to a single function, or aspect of the application program functionality 131. Moreover, such an example generator can avoid ambiguity by both centralizing the generation of examples, thereby avoiding conflict and ambiguity introduced when examples are generated independently and within differing domains, and by utilizing more precise terminology inherent in the labeled knowledge graph which the example generator consumes as input. In such a manner, development of application programs that can accept natural language user input can be facilitated and made more efficient. Additionally, user experience with such application programs can be improved, and user interaction with such application programs can be made more accurate and more efficient.

Figure 2:
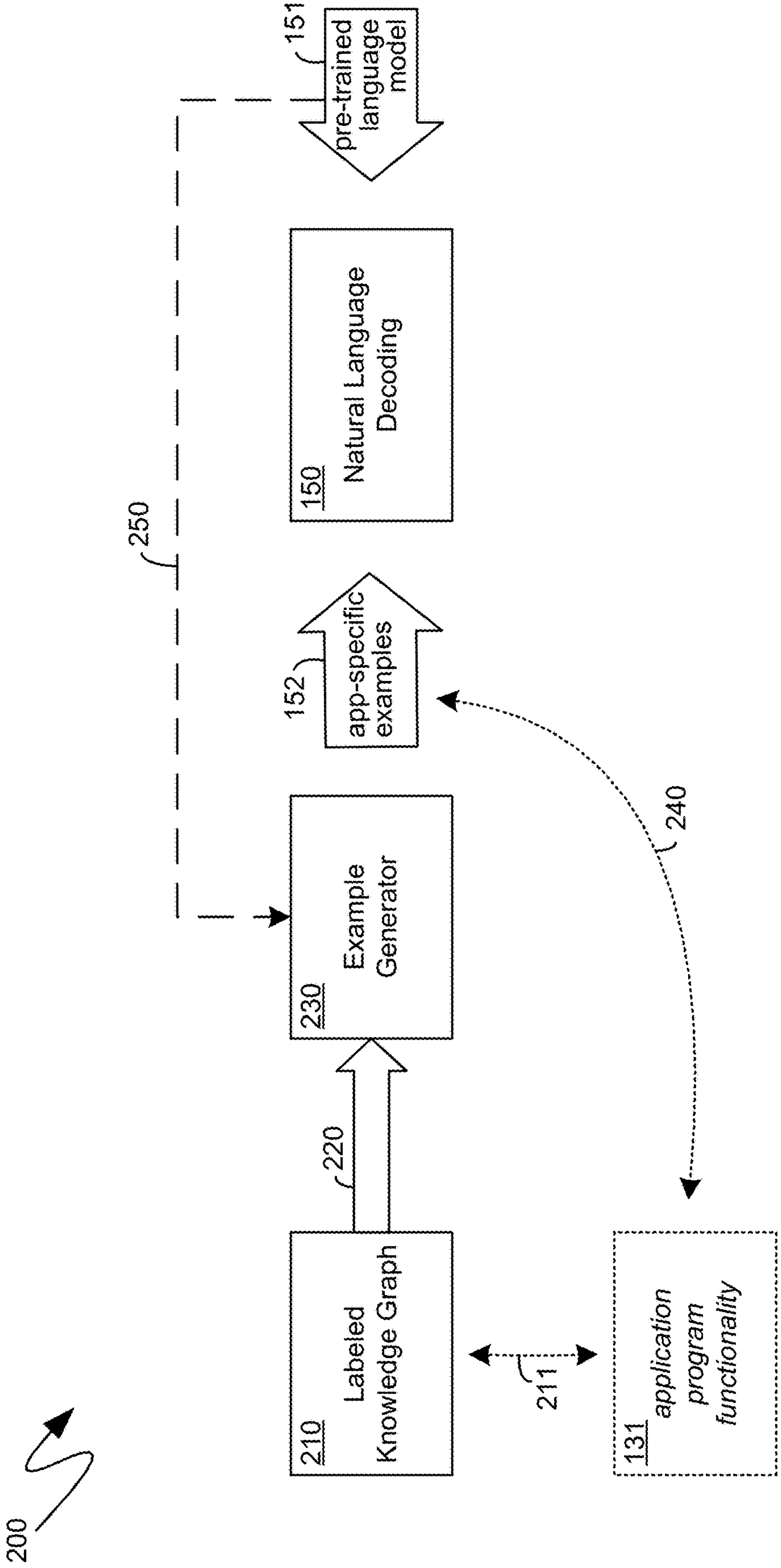
FIG. 2 is a system diagram of an exemplary system for generating optimized natural language input examples for priming an existing natural language model for subsequent utilization to provide natural language input functionality to an independently developed application program.

Turning to FIG. 2, the exemplary system 200 shown therein illustrates an exemplary example generator component 230 that can generate examples 152 that can be optimized to work with the pre-trained language model 151 being utilized by the natural language decoding component 150. According to one aspect, the example generator 230 can generate the examples 152 based on a labeled knowledge graph, such as the exemplary labeled knowledge graph 210, which can be provided as input 220 to the example generator 230. More specifically, a knowledge graph can represent the information and functionality, of which an application program is comprised, linked together through links that indicate correspondences between such information and functionality. Knowledge graphs represent a common and often used paradigm by which application program developers organize, arrange, or otherwise delineate the features, information and functionality of their application programs. The relationship between a knowledge graph, such as the exemplary knowledge graph 210, and application program functionality, such as the exemplary application program functionality 131, is visually represented by the arrow 211.

The example generator 230 can generate the natural language input examples 152 from a labeled knowledge graph, such as the exemplary labeled knowledge graph 210. In a labeled knowledge graph, the nodes and links between the nodes can be labeled with one or more natural language words or phrases. As indicated previously, application program developers often rely on knowledge graphs to delineate the functionality of their application programs. Accordingly, such application program developers are optimally qualified to apply labels, utilizing natural language words or phrases, to the nodes and links of such knowledge graphs. Indeed, often the natural language words or phrases utilized to label the nodes and links of such knowledge graphs will be the natural language words or phrases that the application program developers were already using to nominate aspects of the knowledge graph. As such, it is expected that the labeling of a knowledge graph, such as to generate the labeled a knowledge graph 210, can be more efficient for application program developers to perform than the direct generation of the examples 152.

The utilization of the more precise labels, terms and keywords from the formal model of knowledge that are captured in the graph structure is a meaningful mechanism by which the problems of ambiguity, overlap and sub-optimality identified above are solved by the mechanisms described below. More specifically, the labels of a knowledge graph tend to be significantly less ambiguous due to the reason and purpose for their utilization in the first place. For example, a knowledge graph conveying geometric concepts would be labeled utilizing terms such as "surface area" and "volume", rather than imprecise terms such as "size". The utilization of such more precise terminology in the labeling enables the example generator to generate more distinct, and less conflicting, examples, such as in the manner detailed below. Additionally, the Uniform Resource Indicator (URI) structures utilized within knowledge graphs are, by definition, "unique". The mechanisms described below utilize such uniqueness, and the formalized composition provided by a labeled knowledge graph and apply it to natural language input modeling to solve the problems identified above.

According to one aspect, the example generator 210 can generate the natural language input examples 152 from the labels applied to nodes and links of the labeled knowledge graph 210. As indicated previously, the generation of the natural language input examples 152 can be in coordination with knowledge or functionality that is already part of the pre-trained language model 151. Such coordination is visually represented in FIG. 2 by the arrow 250. For example, a pre-trained language model 151, based on large quantities of natural language that was provided as input to machine learning processes that generated the pre-trained language model 151, can comprise an extensive database or other like knowledge of colloquialisms, phrasings and terminology that express equivalent concepts. Accordingly, the coordination represented by the arrow 250 can entail the example generator 230 minimizing filler words or other transition phrasing when generating the natural language examples 152. In response, the example generator 230 can generate the natural language examples 152 by concatenating two or more natural language labels from the labeled knowledge graph 210 with a minimum of additional wording. For example, the example generator 230 can generate the natural language examples 152 by concatenating the words or phrases from two or more natural language labels with no intermediate words or phrases. Such a concatenation can include appending a word or phrase used to label a link to the end of a word or phrase used to label a preceding node, prepending the word or phrase used to label the link to the beginning of the word or phrase used to label the preceding node, or other like concatenations.

Each of the natural language examples 152 generated by the example generator 230 can correspond to a specific aspect of the application program functionality 131. In such a manner, when a subsequent natural language user input is obtained, and determined, by the natural language decoding component 150, to be most similar to a particular one of the natural language examples 152, the corresponding function or aspect of the application program functionality can be identified and, ultimately, invoked in order to respond to the user's natural language input. Such a correspondence between the given natural language example, of the natural language examples 152, and a specific aspect of the application program functionality 131, can be explicitly indicated, such as through an identifier or other like explicit identification of a unique aspect of the application program functionality 131. Alternatively, such a correspondence can be implicitly indicated, such as through an extrapolation based upon the labels of the labeled knowledge graph 210, or other like implicit indicator. The correspondence between a specific one of the natural language examples 152, and a specific aspect of the application program functionality is visually illustrated in FIG. 2 by the arrow 240.

Figure 3:
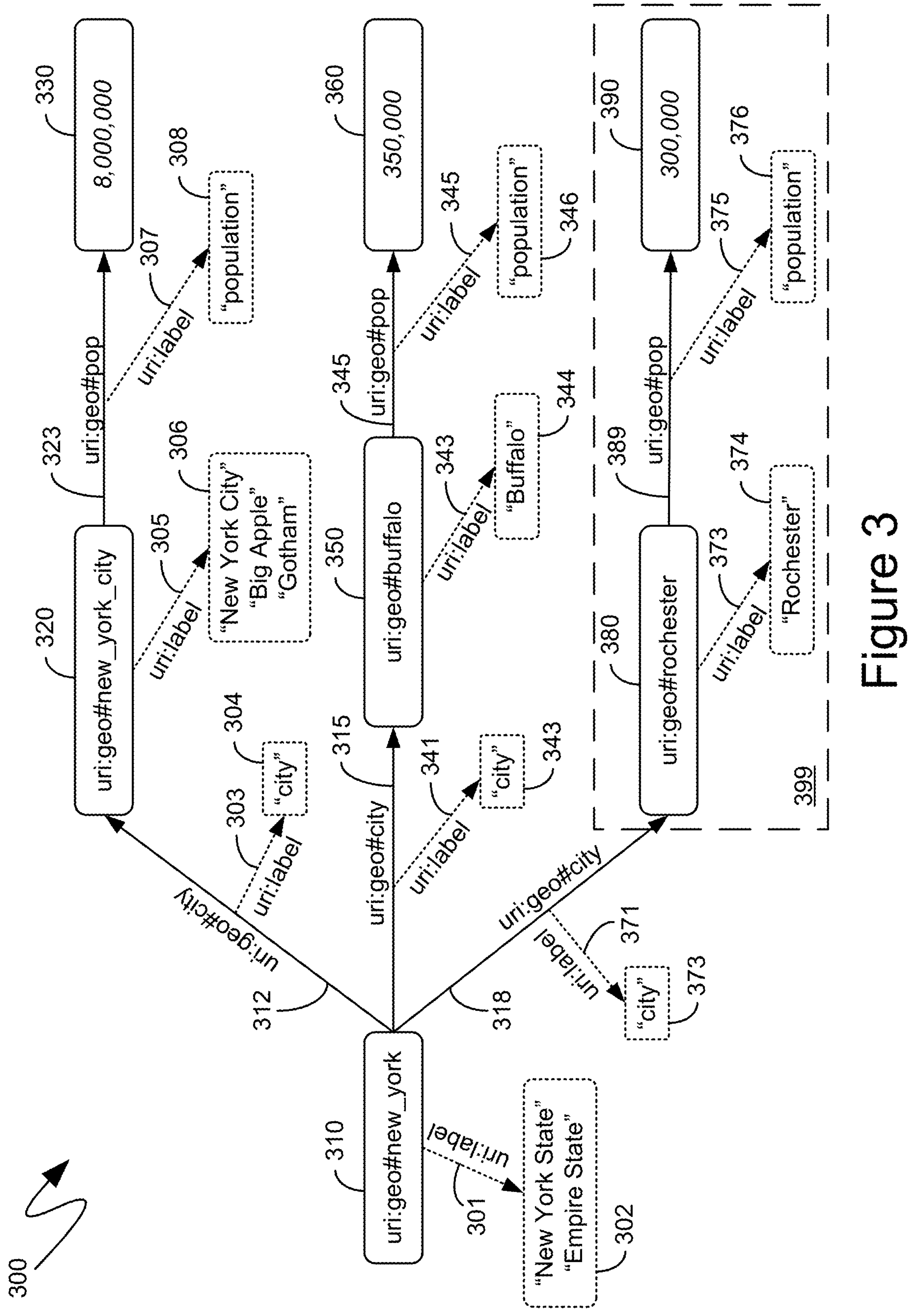
FIG. 3 is a system diagram of an exemplary labeled knowledge graph utilizable to generate optimized natural language input examples for priming an existing natural language model.

Turning to FIG. 3, the exemplary system 300 shown therein illustrates a very simple exemplary labeled knowledge graph that can provide context for descriptions of the operation of the example generator detailed above. As can be seen, the very simple knowledge graph shown in FIG. 3 can be a portion of a knowledge graph of an application program providing information to users, such as, in the specific example illustrated, information regarding the population of various cities. Accordingly, an exemplary node 320 can represent, within the context of the functionality of the application program, the concept of New York City. Such a node 320 can be connected through a link 323 to a subsequent node 330, representing the value eight million. The link 323 can signify the relationship between New York City and the quantity eight million, the relationship being that the population of New York City is eight million people. Analogously, a link 345, representing the concept of population, can connect the node 350, representing the concept of the city of Buffalo, to the node 360, representing the quantity 350,000 and a link 389, also representing the concept of population, can connect the node 380, representing the concept of the city of Rochester, to the node 390, representing the quantity 300,000.

A further node, such as the exemplary node 310, can represent the concept of the state of New York. Each of the links 312, 315 and 318 can then, in turn, signify the relationship between the concept of the state of New York, as represented by the node 310, and the concepts of the cities of New York City, represented by the node 320, of Buffalo, represented by the node 350, and of Rochester, represented by the node 380, respectively. The links 312, 315 and 318 can, thereby, represent the concept of a city relationship, namely between New York State and the enumerated cities. Typically, the knowledge graph can be expressed in the form of triples, with each triple comprising a source node, a destination node, and a link between them. For example, the exemplary triple 399 comprises a source node 380, representing the concept of the city of Rochester, a destination node 390, representing a value of 300,000, and a link between them, namely the link 389, representing the population relationship between the city of Rochester and the value of 300,000. Accordingly, the exemplary triple 399 can represent the information that the population of the city of Rochester is 300,000.

As indicated previously, a knowledge graph, such as the exemplary knowledge graph shown in FIG. 3, can have its nodes and edges labeled with natural language labels identifying the nodes and edges. For example, the link 389, representing the relationship between the nodes 380 and 390, can be labeled with the natural language word "population", since the relationship indicated by the link can be a population relationship. According to one aspect, such a label can itself be a node in the knowledge graph, such as the exemplary node 376, and can be linked to the link 389 via a separate link 375 representing that the node 376 is a label of the link 389. In an analogous manner, the link 345 can also be labeled "population", as represented by the node 346 and the connecting link 345, and the link 323 can, likewise, also be labeled "population", as represented by the node 308, and the connecting link 307. Links 312, 315 and 318 can be labeled with the natural language word "city", since the relationship indicated by those links can be a city relationship. Accordingly, the link 312 can be labeled "city", as represented by the node 304 and the connecting link 303, the link 315 can be labeled "city", as represented by the node 343 and the connecting link 341, and the link 318 can be labeled "city", as represented by the node 373 and the connecting link 371. The node 380, representing the concept of the city of Rochester, can be labeled with the natural language name "Rochester", as illustrated by the node 374 and the connecting link 373. Similarly, the node 350, representing the concept of the city of Buffalo, can be labeled with the natural language name "Buffalo", as illustrated by the node 344 and the connecting link 343.

In some instances, a natural language label can include both a preferred, or primary, label, and one or more alternative, or secondary, labels. Such labels can be alternative names, such as nicknames, alternative phrasing, or other like alternatives. For example, the label applied to the node 320, representing the concept of the city of New York City, can include both the formal name "New York City" as well as one or more alternative names, or nicknames, such as the "Big Apple" or "Gotham". As such, the node 306, representing the labels applied to the node 320, as represented by the labeling link 305, can comprise the natural language words "New York City", together with an implicit or explicit indication that such natural language words represent a preferred, or primary, label, along with the natural language words "Big Apple" and "Gotham", together with an implicit or explicit indication that such natural language words represent an alternative, or secondary, label for the node 320. In a similar manner, the node 310, representing the concept of the state of New York State, can be labeled with the natural language words "New York State" as a preferred label, and the natural language words "Empire State" as an alternative label, such as illustrated by the node 302, which can be connected to the node 310 via the labeling link 301.

Utilizing a labeled knowledge graph, such as the exemplary labeled knowledge graph 300 shown in FIG. 3, a natural language input example generator can generate examples of natural language inputs that are to correspond to specific aspects of the functionality offered by an application program represented by the labeled knowledge graph 300. As indicated previously, a labeled knowledge graph can be parsed into discrete triples, such as the exemplary triple 399. According to one aspect, a natural language input example can be generated by concatenating the labels applied to a source node of a triple and to a link of that triple. Thus, for example, a natural language input example of the form "Rochester population" can be generated corresponding to the triple 399. As can be seen, the natural language input example "Rochester population" can be generated by concatenating the natural language words of the label applied to the source node 380 of the triple 399, namely the natural language word "Rochester", as contained in the label node 374 and the natural language words of the label applied to the link 389 of the triple 399, namely the natural language word "population", as contained in the label node 376. Such a concatenation can be the appending of the natural language word or phrase utilized to label the link of a triple onto the end of the natural language word or phrase utilized to label the source node of the same triple. Alternatively, or in addition, such a concatenation can be the prepending of the natural language word or phrase utilized to label the link of a triple onto the beginning of the natural language word or phrase utilized to label the source node of the same triple. Thus, for example, a natural language input example of the form "population Rochester" could also be generated for the exemplary triple 399.

As indicated previously, the generation of natural language input examples can be tuned based on the knowledge or construct of the pre-existing natural language model. For example, if the pre-existing natural language model has substantial familiarity with colloquialisms, filler words, and other like natural language constructs relevant to the concepts embodied by the functionality offered by an application program, simpler examples that avoid alternatives of such colloquialisms filler words and other like natural language constructs can avoid duplication and/or confusion. Thus, for example, to generate an optimized natural language input example corresponding to application program functionality for returning the population of the city of Rochester, a simple example form from the concatenation of labels, such as the "Rochester population" and/or "population Rochester" natural language input examples whose generation was detailed above, would be optimal.

According to one aspect, a correlation between generated natural language input examples and the corresponding functionality can be explicitly provided. In such an instance, functionality associated with the destination node of the triple, such as the exemplary destination node 390 of the exemplary triple 399, can be identified or otherwise correlated to the generated natural language input examples. In the example shown in FIG. 3, and detailed herein, the functionality associated with the node 390 can include the presentation, to a user, of the value 300,000. Such functionality can be associated with a specific subroutine that can have a unique identifier; in which case such a unique identifier can be explicitly provided with the generated natural language input examples. Implicit identifications can also be utilized, which can be based on the already existing labels, and their association with the generated natural language input examples. Ultimately, the natural language input examples can be implicitly or explicitly linked to the triple 399 and/or the functionality associated with the node 390 such that, if a particular natural language user input is determined to be closest to the generated natural language input examples associated with the triple 399 and/or the functionality associated with the node 390, such functionality can be invoked to respond to that particular natural language user input. Thus, for example, if a user were to ask "how many people live in Rochester?", then the determination that such a natural language input is closest to the generated natural language input example "Rochester population", can result in an invocation of the functionality associated with the node 390, which can result in the application program presenting the user with the numeric value "300,000" in response to the user's natural language input. From the user's perspective, the natural language question "how many people live in Rochester?" was answered with the output "300,000."

As indicated previously, labels assigned to nodes or links can include both preferred and alternative natural language labels. In such an instance, multiple natural language input examples can be generated to account for the alternative natural language labels. For example, as detailed above, the node 306 can include alternative natural language labels for the node 320, representing the concept of New York City, including the alternative natural language labels "Big Apple" and "Gotham." Accordingly, in addition to generating a natural language input example of the form "New York City population" for the triple comprising the source node 320, the link 323 and the destination node 330, the example generator can also generate, for that same triple, another natural language input example of the form "Big Apple population" and/or another natural language input example of the form "Gotham population." As can be seen, such multiple examples can represent concatenations of the preferred label of the node 320 with the preferred label of the link 323 as well as concatenations of one or more of the alternative labels of the node 320 with the preferred label of the link 323. Still further natural language examples can be generated by concatenating the labels of the node 320 and the link 323 by prepending the label of the link 323 onto the front of the preferred and alternative labels of the node 320. Thus, further natural language input examples can be generated that are, in the present example, of the form "population Big Apple" and/or "population Gotham."

In instances where multiple nodes and/or links, whose labels are being concatenated to form the natural language input examples, each comprise both preferred and alternative natural language labels, the natural language input example generator can concatenate specific ones, or all, of the permutations of the preferred and alternative natural language labels. In shorthand, if one node and/or link comprised a preferred label "A" and alternative labels "B" and "C", and another node and/or link comprised a preferred label "X" and an alternative label "Y", then the natural language input example generator could generate a preferred natural language input example of the form "AX" and/or "XA" and could further generate one or more alternative natural language input examples of the form "AY", "BX", "BY", "CX, "CY", "YA", "XB", "YB", "XC" and/or "YC." The selection of which one or more such alternative natural language input examples to generate can be part of the tuning process such as was represented by the arrow 250 in FIG. 2 and described in detail above.

Figure 4:
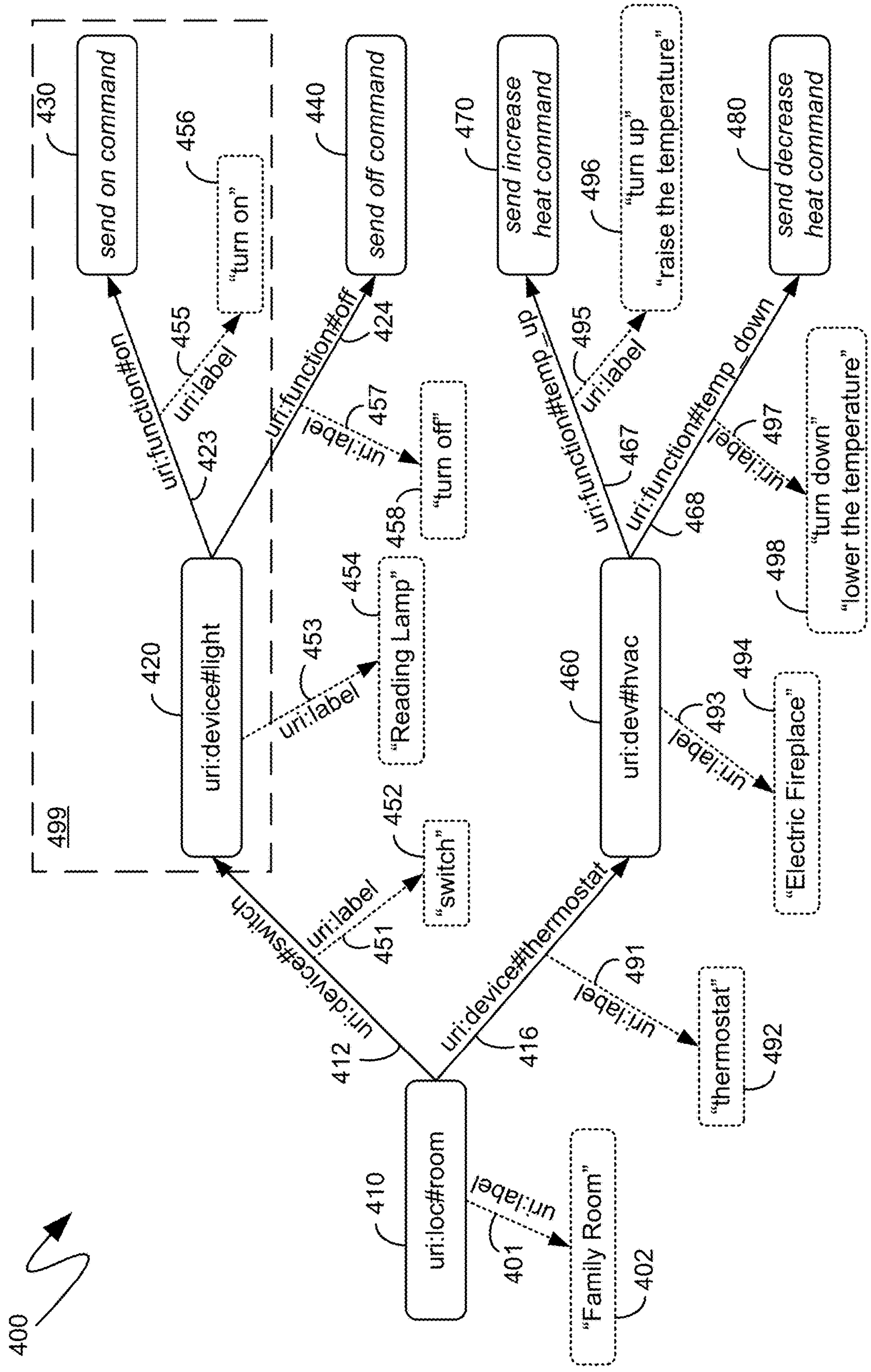
FIG. 4 is a system diagram of another exemplary labeled knowledge graph utilizable to generate optimized natural language input examples for priming an existing natural language model.

While the exemplary labeled knowledge graph 300 shown in FIG. 3 illustrates an exemplary operation of a natural language input example generator within the context of an information presentation application program, such as an application program that can provide geographic information, equivalent mechanisms can be utilized to generate natural language input examples within the context of application programs that control external devices, or otherwise perform like actions. For example, the exemplary labeled knowledge graph 400 shown in FIG. 4 illustrates a very simple labeled knowledge graph for an application program that could control external devices, such as a home automation application program, which could be an embedded program on a home automation computing device, or can be a standalone application program executing on a general-purpose computing device.

As can be seen, the exemplary labeled knowledge graph 400 comprises a node 410 that can represent the concept of a specific room, a node 420 that can represent the concept of a light-producing device, and a link 412 between the node 410 and the node 420, with the link representing the concept of a switch, such that the node 420 represents a type of switch in the room represented by the node 410. In a similar manner, the node 460 can represent the concept of a Heating Ventilation Air Conditioning (HVAC) device, and the link 416 between the node 410 and 420 can represent the concept of a thermostat, such that the node 460 represents a type of thermostat in the room represented by the node 410. One or more of the nodes 410, 420 and 460 can have labels applied to them, as can the links 412 and 416. For example, the node 410 can have a label of the form "Family Room" applied to it, as illustrated by the label node 402 and the labeling link 401 which associates the label of node 402 to the concept of a room represented by the node 410. Similarly, the node 420 can have a label of the form "Reading Lamp" applied to it, as illustrated by the label node 454 and the corresponding labeling link 453, and the node 460 can have a label of the form "Electric Fireplace" applied to it, as illustrated by the label node 494 and the corresponding labeling link 493.

Still further nodes, such as the exemplary nodes 430, 440, 470 and 480, can represent the functionality of instructing an external device. For example, the node 430 can represent the concept of sending an "on" command to an external device, and the node 440 can represent the concept of sending an "off" command to such a device. Similarly, as another example, the node 470 can represent the concept of sending a "heat increase" commands to an external device, and the node 480 can represent the concept of sending a "heat decrease" command to that same device. Nodes 470 and 480 can be linked to a particular type of device, namely the concept of an HVAC device represented by the node 460. More specifically, the link 467 can connect the concept of a "heat increase" command, represented by the node 470, to the concept of an HVAC device, represented by the node 460 and, similarly, the link 468 can connect the concept of a "heat decrease" command, represented by the node 480, to the same concept of an HVAC device, represented by the node 460. In an analogous manner, nodes 430 and 440 can also be linked to a particular type of device, namely the concept of a light-producing device represented by the node 420. As such, the link 423 can connect the concept of an "on" command, represented by the node 430, to the concept of the light-producing device, represented by the node 420 and, similarly, the link 424 can connect the concept of an "off" command, represented by the node 440, to the concept of the light-producing device represented by the node 420.

In the exemplary labeled knowledge graph 400, each of the links 423, 424, 467 and 468 can also be labeled. For example, the link 423 can have a label of the form "turn on", as represented by the label node 456, which is applied to, or otherwise associated with, the link 423 via the labeling link 455, and, similarly, the link 424 can have a label of the form "turn off", as represented by the label node 458, which is applied to the link 424 via the labeling link 457. In an analogous manner the link 467 can have a label of the form "turn up", as represented by the label node 496, which is applied to the link 467 via the labeling link 495, and, similarly, the link 468 can have a label of the form "turn down", as represented by the label node 498, which is applied to the link 468 via the labeling link 497. As detailed above, certain labels can include both preferred labels and alternative labels. Thus, for example, the labels applied to the link 467 can include a preferred label of the form "turn up", and an alternative label of the form "raise the temperature", and, likewise, the labels applied to the link 468 can include a preferred label of the form "turn down", and an alternative label of the form "lower the temperature."

As indicated previously, the generation of natural language input examples can entail the concatenation of labels from a source node of a triple and from a link of the triple. Thus, for example, with reference to the exemplary triple 499, comprising a source node 420, a destination node 430, and a link 423 connecting the source node 422 the destination node 430, a natural language input example for the triple 499 can be of the form "Reading Lamp turn on." Another example can be generated by the concatenation of the same labels, except in reverse order, such that, for the triple 499, a natural language input example of the form "turn on Reading Lamp" can also be generated.

According to one aspect, the generation of natural language input examples can comprise the further concatenation of labels of preceding elements in the knowledge graph to which the triple, for which the natural language input examples are being generated, is linked. Thus, for example, for the exemplary triple 499, shown in FIG. 4, a natural language input example can be generated by concatenating the labels of one or more of the preceding node 410 and preceding link 412, including, for example, natural language input examples of the form "Family Room Reading Lamp turn off", "turn off Family Room Reading Lamp", "Family Room turn off Reading Lamp", and/or other like permutations. Again, utilizing shorthand for ease of explanation, a triple having a source node with a label "A", a link with a label "B", and preceding elements in the knowledge graph having a label "X", can result in natural language input examples of the form "ABX", "AXB", "XAB", "BXA", "BAX" and/or "XBA". The selection of which one or more such alternative natural language input examples to generate can be part of the tuning process such as was represented by the arrow 250 in FIG. 2 and described in detail above. Moreover, to the extent that one or more of the labels include both preferred and alternative labels, alternative combinations and permutations of the labels, as detailed above, can be the basis of generating still further natural language input examples corresponding to a triple, such as the exemplary triple 499.

Figure 5:
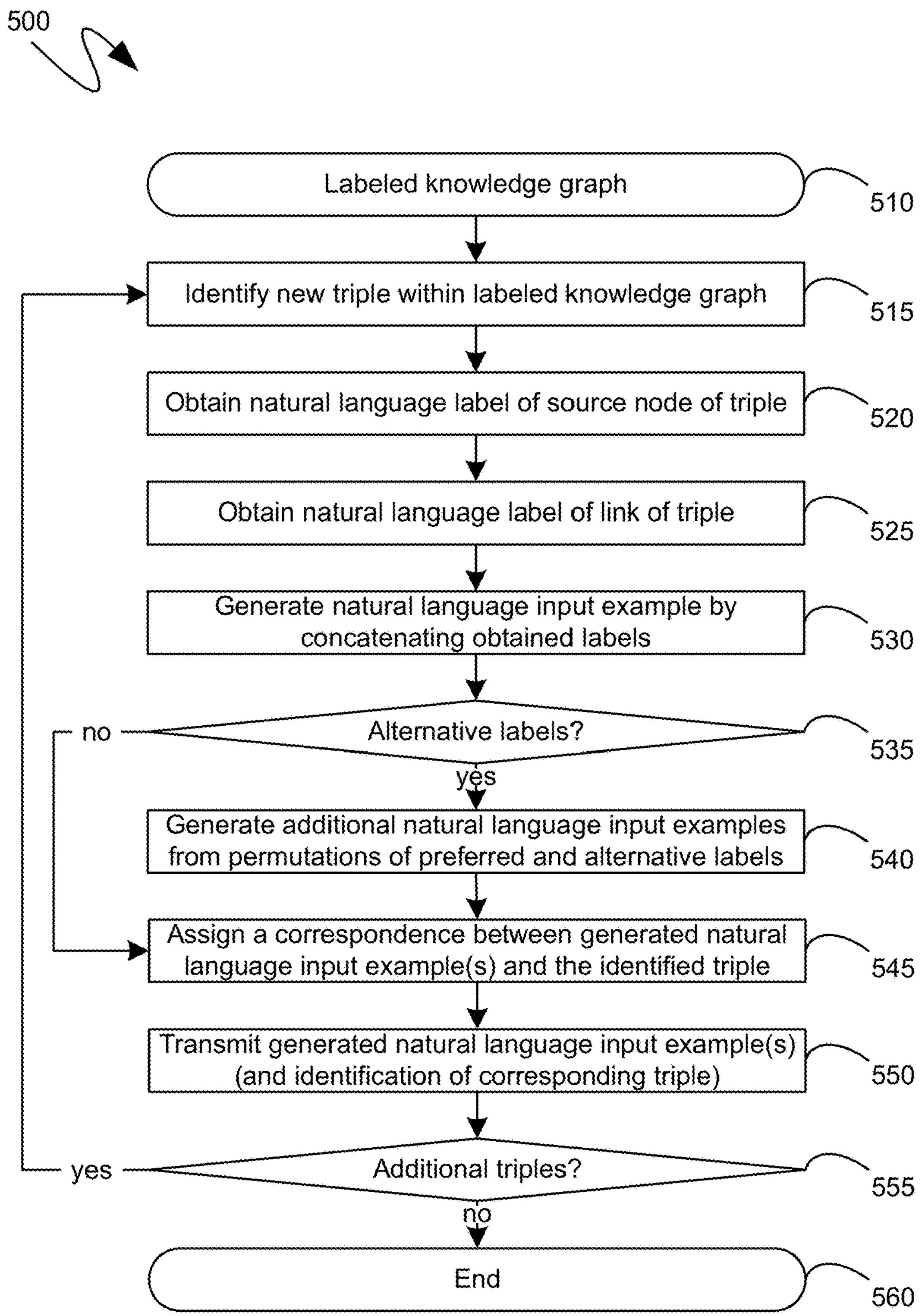
FIG. 5 is a flow diagram of an exemplary generation of optimized natural language input examples for priming an existing natural language model for subsequent utilization to provide natural language input functionality to an independently developed application program.

Turning to FIG. 5, the flow diagram 500 shown therein illustrates an exemplary series of steps by which one or more natural language input examples can be generated in order to enable a natural language processing component to utilize pre-existing natural language models as a basis for comparing a user's natural language input to the provided examples, and, thereby, enable user natural language input to invoke and access corresponding functionality of an application program. Initially, as illustrated in FIG. 5, the exemplary flow diagram 500 can commence with the obtaining or receiving of a labeled knowledge graph at step 510. Subsequently, at step 515 a triple within the knowledge graph of step 510 can be identified. At step 520 a natural language label of a source node of the triple of step 515 can be obtained and, at step 525, a natural language label of the link of the triple of step 515 can be obtained. Subsequently at step 530, a natural language input example can be generated by concatenating the obtained labels of steps 520 and 525. As indicated previously, such concatenation, at step 530, can entail the appending of the natural language label of the link, obtained at step 525, onto the end of the natural language label of the source node, obtained at step 520. Alternatively, or in addition, such concatenation, at step 530, can entail the prepending of the natural language label of the link, obtained at step 525, to the beginning of the natural language label of the source node, obtained at step 520. As also indicated previously, the generation of natural language input examples can further comprise the concatenation of other nodes and links, such as, specifically, the nodes and links that precede the triple identified at step 515. In such an instance, in addition to steps 520 and 525, other steps can be performed to obtain the natural language labels of the preceding nodes and links.

At step 535, after the generation of natural language input examples at step 530, a determination can be made as to whether any of the labels, obtained at steps 520 and 525, or any other like steps, contain alternative labels in addition to preferred labels. If no such alternative labels exist, processing can proceed to step 545. However, if such alternative labels are identified at step 535, then processing can proceed to step 540 and additional natural language input examples can be generated from permutations and combinations of preferred and alternative labels, such as in the manner detailed above. At step 545, then, a correspondence between the generated natural language input examples and the triple identified at step 515 can be assigned. As indicated previously, such a correspondence can be explicitly indicated, such as with identifiers of the functionality of the destination node of the triple identified at step 515, identifiers of the triple itself, identifiers of relevant function calls, subroutines, or other like explicit identifications. Alternatively, as also indicated previously, such a correspondence can be implicitly indicated such as by the implicit relationship between the natural language input examples generated and the labels of the corresponding nodes.

At step 550, the generated natural language input examples, and any explicitly indicated correspondence with aspects of the labeled knowledge graph and/or functionality of the corresponding application program, can be transmitted, or otherwise provided, such as to a natural language processing component. At step 550, processing can revert back to step 515 to identify a new triple, and then proceed as before, or, alternatively, if all appropriate, delineated, or otherwise indicated, triples have already been identified and processed, the relevant processing can end at step 560.

Figure 6:
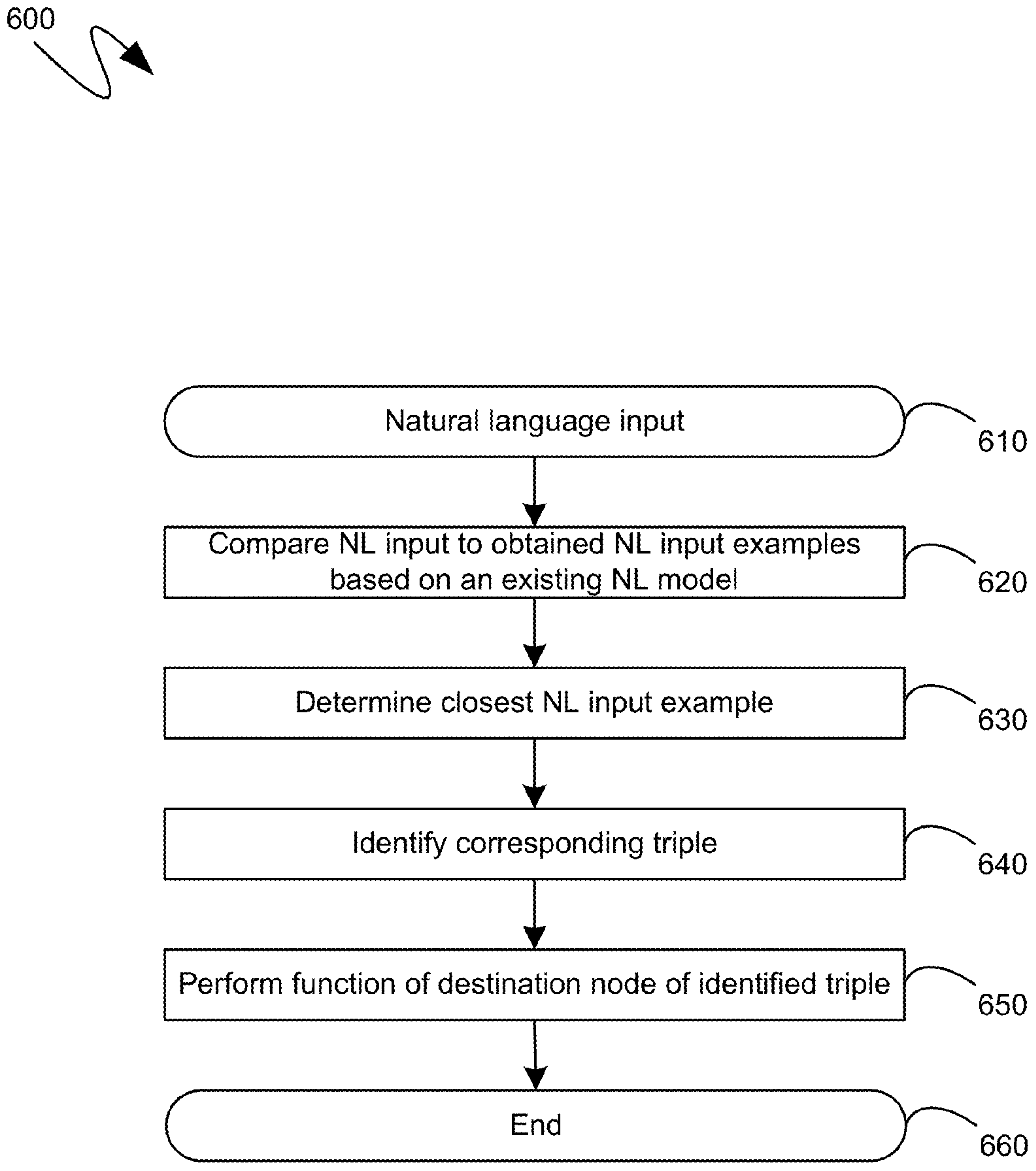
FIG. 6 is a flow diagram of an exemplary utilization of an existing natural language model to provide natural language input functionality to an independently developed application program.

Turning to FIG. 6, the flow diagram 600 shown therein illustrates an exemplary series of steps by which the natural language input examples generated and provided by the mechanisms detailed above, including, for example, in the exemplary flow diagram 500, can be utilized to facilitate application programs to accept and respond to natural language user input. More specifically, and as illustrated in FIG. 6, initially, at step 610, a natural language user input can be received, or otherwise obtained. At step 620, a comparison can be made between the natural language input of step 610 and the aforementioned natural language input examples. As indicated previously, the comparison, at step 620, can be based on an existing natural language model, which can provide the basis by which determinations are made as to the closeness of the natural language input to one or more of the natural language input examples. As also indicated previously, such a comparison can be performed utilizing a number of statistical, analytical, machine learning, and other like comparative mechanisms. At step 630, the results of the comparison of step 620 can determine a natural language input example that is deemed to be most similar, or otherwise "closest" to the natural language input of step 610. Subsequently, at step 640, an identification can be made of a corresponding triple, or other like implicit or explicit correspondence between the natural language input example of step 630 and an application program's labeled knowledge graph, functionality, or the like. Based upon such a correspondence, identified at step 640, the identified function of the application program can be invoked, or otherwise performed, at step 650. In such a manner, the application program can be responsive, through the performance of the function at step 650, to the user's natural language input, received at step 610. The relevant processing can then end at step 660.

Figure 7:
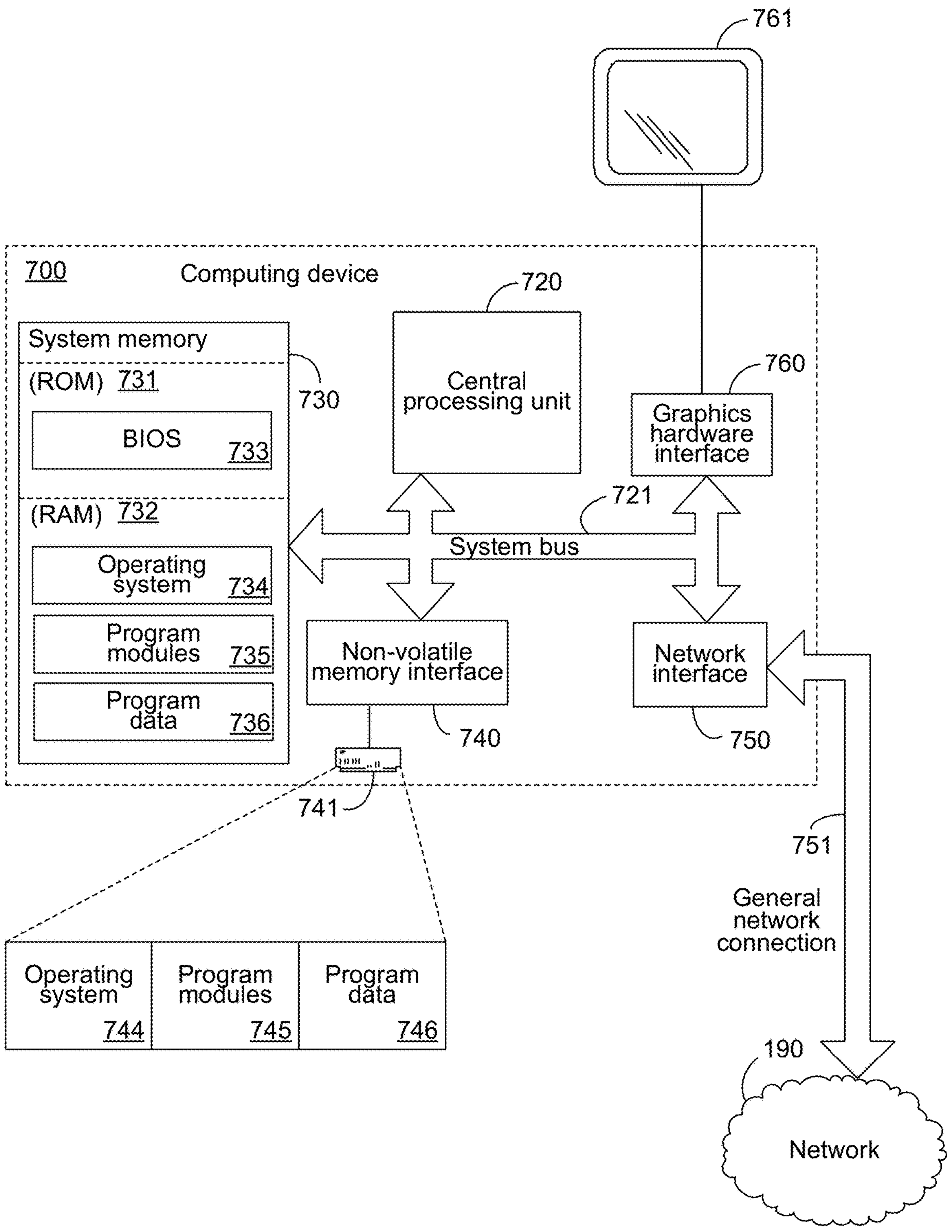
FIG. 7 is a block diagram of an exemplary computing device.

Turning to FIG. 7, an exemplary computing device 700 is illustrated which can perform some or all of the mechanisms and actions described above. The exemplary computing device 700 includes, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 760 and a display device 761, which includes display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which includes any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 751 (to a network 752) through a network interface or adapter 750, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 771. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method of providing user access to application program functionality through user natural language input, the method comprising: generating natural language input examples from a labeled knowledge graph of an application program providing the application program functionality, the generating comprising: identifying a first triple within the labeled knowledge graph, the first triple comprising a first source node, a first link, and a first destination node, wherein: the first destination node is a node in the labeled knowledge graph corresponding to a first function of the application program functionality; the first link connects the first source node to the first destination node and delineates a programmatic relationship within the application program between the first source node and the first destination node; the first source node is labeled with a first label comprising a first preferred natural language word or phrase; and the first link is labeled with a second label comprising a second preferred natural language word or phrase; and generating a first natural language input example by concatenating the first preferred natural language word or phrase and the second preferred natural language word or phrase; receiving a first user natural language input; determining that the first user natural language input corresponds more to the first natural language input example than to any other of the generated natural language input examples; identifying the first triple based on the determination of the first natural language input example; and providing an identification of the first triple to the application program, the application program responding to the first user natural language input by performing the first function based on receiving the provided identification of the first triple, the application program thereby providing the user access to the application program functionality through the natural language input.

A second example is the method of the first example, wherein the generating the natural language input examples further comprises: traversing the labeled knowledge graph to identify additional triples within the labeled knowledge graph; and repeating the generating with the labels of source node and links of the identified additional triples.

A third example is the method of the first example, wherein the generating the first natural language input example comprises prepending the first preferred natural language word or phrase directly to the second preferred natural language word or phrase.

A fourth example is the method of the first example, wherein the generating the first natural language input example comprises appending the first preferred natural language word or phrase directly to the second preferred natural language word or phrase.

A fifth example is the method of the first example, wherein the generating the first natural language input example comprises: concatenating a third preferred natural language word or phrase with the concatenation of the first preferred natural language word or phrase and the second preferred natural language word or phrase; wherein: a second triple within the labeled knowledge graph comprises a second source node, a second link, and a second destination node; the first source node of the first triple is the second destination node of the second triple; and either the second source node or the second link is labeled with a third label comprising the third preferred natural language word or phrase.

A sixth example is the method of the first example, wherein the generating the natural language input examples further comprises: generating a second natural language input example by concatenating a first alternative natural language word or phrase and the second preferred natural language word or phrase; wherein the first label further comprises the first alternative natural language word or phrase as an alternative to the first preferred natural language word or phrase.

A seventh example is the method of the sixth example, wherein the generating the natural language input examples further comprises: generating a third natural language input example by concatenating either: (1) the first preferred natural language word or phrase and a second alternative natural language word or phrase or (2) the first alternative natural language word or phrase and the second alternative natural language word or phrase; wherein the second label further comprises the second alternative natural language word or phrase as an alternative to the second preferred natural language word or phrase.

An eighth example is the method of the sixth example, further comprising: associating the first natural language input example with a first priority; and associating the second natural language input example with a second priority that is lower than the first priority.

A ninth example is the method of the first example, wherein the receiving, the determining, the identifying, and the providing the identification are performed during runtime of the application program; and wherein further the generating the natural language input examples is performed prior to the runtime of the application program.

A tenth example is the method of the first example, wherein the first user natural language input is a question; and wherein further the first function comprises a first information that is responsive to the question.

An eleventh example is a method of priming an existing natural language model to provide user access to application program functionality through user natural language input, the method comprising: obtaining a labeled knowledge graph of the application program, the labeled knowledge graph comprising: a first destination node corresponding to a first function of the application program functionality; a first link connecting a first source node to the first destination node, the first link delineating a programmatic relationship within the application program between the first source node and the first destination node; a first label applied to the first source node, the first label comprising a first preferred natural language word or phrase; and a second label applied to the first link, the second label comprising a second preferred natural language word or phrase; identifying a first triple within the labeled knowledge graph, the first triple comprising the first source node, the first link, and the first destination node; generating a first natural language input example by concatenating the first preferred natural language word or phrase and the second preferred natural language word or phrase; and providing the generated first natural language input example to a natural language processor, the user access to the application program functionality through the user natural language input being provided, at least in part, by the natural language processor utilizing the existing natural language model to determine similarities between the user natural language input and provided natural language input examples, including the first natural language input example.

A twelfth example is the method of the eleventh example, further comprising: traversing the labeled knowledge graph to identify additional triples within the labeled knowledge graph; and repeating the generating and the providing for the identified additional triples.

A thirteenth example is the method of the eleventh example, wherein the generating the first natural language input example comprises prepending the first preferred natural language word or phrase directly to the second preferred natural language word or phrase.

A fourteenth example is the method of the eleventh example, wherein the generating the first natural language input example comprises appending the first preferred natural language word or phrase directly to the second preferred natural language word or phrase.

A fifteenth example is the method of the eleventh example, wherein the generating the first natural language input example comprises: concatenating a third preferred natural language word or phrase with the concatenation of the first preferred natural language word or phrase and the second preferred natural language word or phrase; wherein: the labeled knowledge graph further comprises a second triple, the second triple comprising: a second source node, a second link, and a second destination node; the first source node of the first triple is the second destination node of the second triple; and either the second source node or the second link is labeled with a third label comprising the third preferred natural language word or phrase.

A sixteenth example the method of the eleventh example, further comprising: generating a second natural language input example from the concatenation of the first and second labels, the second natural language input example comprising the second preferred natural language word or phrase appended to a first alternative natural language word or phrase; and providing the second natural language input example to the natural language processor; wherein the first label further comprises the first alternative natural language word or phrase.

A seventeenth example is the method of the sixteenth example, wherein the providing the generated first natural language input example to the natural language processor comprises identifying, to the natural language processor, that the generated first natural language input example is associated with a first priority; and wherein the providing the generated second natural language input example to the natural language processor comprises identifying, to the natural language processor, that the generated second natural language input example is associated with a second priority that is lower than the first priority.

An eighteenth example is a method of the eleventh example, wherein the providing the generated first natural language input example to the natural language processor further comprises identifying the generated first natural language input example as corresponding to the identified first triple.

A nineteenth example is the method of the eleventh example, wherein the first user natural language input is a question; and wherein further the first function comprises a first information that is responsive to the question.

A twentieth example is one or more computer-readable storage media comprising computer-executable instructions, which, when executed by one or more processing units, cause one or more computing devices, in aggregate, to: obtain a labeled knowledge graph of an application program, the labeled knowledge graph comprising: a first destination node corresponding to a first function of the application program; a first link connecting a first source node to the first destination node, the first link delineating a programmatic relationship within the application program between the first source node and the first destination node; a first label applied to the first source node, the first label comprising a first preferred natural language word or phrase; and a second label applied to the first link, the second label comprising a second preferred natural language word or phrase; identify a first triple within the labeled knowledge graph, the first triple comprising the first source node, the first link, and the first destination node; generate a first natural language input example by concatenating the first preferred natural language word or phrase and the second preferred natural language word or phrase; and provide the generated first natural language input example to a natural language processor that utilizes an existing natural language model to determine similarities between user natural language input and natural language input examples, including the generated first natural language input example, thereby enabling user access to application program functionality through user natural language input.

As seen from the above descriptions, mechanisms for generating optimized natural language input examples from a labeled knowledge graph in order to prime an existing natural language model have been presented. In view of the many possible variations of the subject matter described herein, we claim as our invention all such embodiments as may come within the scope of the following claims and equivalents thereto.

I claim:

1. A computer-implemented method comprising:
- receiving a natural language input;
- parsing a labeled knowledge graph of an application program;
- generating, from the labeled knowledge graph, natural language input examples, wherein the natural language input examples include concatenated natural language words or phrases of multiple labels from the labeled knowledge graph;
- comparing the natural language input with the natural language input examples;
- based on the comparing, determining that the natural language input is for a function provided by the application program; and
- based on the determining, invoking the function provided by the application program.

2. The computer-implemented method of claim 1, wherein the comparing is performed using a pre-trained language model that analyzes the natural language input.

3. The computer-implemented method of claim 1, wherein the labeled knowledge graph comprises triples comprising nodes and links, wherein the nodes and the links between the nodes in the labeled knowledge graph are labeled with a natural language word or phrase, and wherein parsing the labeled knowledge graph includes identifying the nodes and the links between the nodes.

4. The computer-implemented method of claim 1, wherein the concatenated natural language words or phrases include a word or phrase used to label a link appended to an end of a word or phrase used to label a preceding node.

5. The computer-implemented method of claim 1, wherein the concatenated natural language words or phrases include a word or phrase used to label a link prepended to a beginning of a word or phrase used to label a preceding node.

6. The computer-implemented method of claim 1, wherein each of the natural language input examples corresponds to a functionality provided by the application program.

7. The computer-implemented method of claim 1, wherein the comparing further comprises:
- determining one of the natural language input examples that is most similar or closest to the natural language input;
- providing a correspondence between the one of the natural language input examples and the labeled knowledge graph of the application program; and
- based upon the correspondence, identifying a function provided by the application program.

8. A non-transitory computer storage medium comprising computer-executable instructions, which, when executed by a processing unit, perform a method comprising:

receiving a natural language input;

parsing a labeled knowledge graph of an application program;

generating, from the labeled knowledge graph, natural language input examples, wherein the natural language input examples include concatenated natural language words or phrases of multiple labels from the labeled knowledge graph;

comparing the natural language input with the natural language input examples;

based on the comparing, determining that the natural language input is for a function provided by the application program; and based on the determining, invoking the function provided by the application program.

9. The non-transitory computer storage medium of claim 8, wherein the comparing is performed using a pre-trained language model that analyzes the natural language input.

10. The non-transitory computer storage medium of claim 8, wherein the labeled knowledge graph comprises nodes and links, wherein the nodes and the links between the nodes in the labeled knowledge graph are labeled with a natural language word or phrase.

11. The non-transitory computer storage medium of claim 8, wherein the concatenated natural language words or phrases includes a word or phrase used to label a link appended to an end of a word or phrase used to label a preceding node.

12. The non-transitory computer storage medium of claim 8, wherein the concatenated natural language words or phrases include a word or phrase used to label a link prepended to a beginning of a word or phrase used to label a preceding node.

13. The non-transitory computer storage medium of claim 8, wherein each of the natural language input examples corresponds to a functionality provided by the application program.

14. The non-transitory computer storage medium of claim 8, wherein the comparing further comprises:

determining one of the natural language input examples that is most similar or closest to the natural language input;

providing a correspondence between the one of the natural language input examples and the labeled knowledge graph of the application program; and based upon the correspondence, identifying a function provided by the application program.

15. A system comprising:

a processing unit; and a computer-readable medium comprising computer-executable instructions, which, when executed by the processing unit, perform a method comprising:

receiving a natural language input;

parsing a labeled knowledge graph of an application program;

generating, from the labeled knowledge graph, natural language input examples, wherein the natural language input examples include concatenated natural language words or phrases of multiple labels from the labeled knowledge graph;

comparing the natural language input with the natural language input examples;

based on the comparing, determining that the natural language input is for a function provided by the application program; and based on the determining, invoking the function provided by the application program.

16. The system of claim 15, wherein the comparing is performed using a pre-trained language model that analyzes the natural language input.

17. The system of claim 15, wherein the labeled knowledge graph comprises nodes and links, wherein the nodes and the links between the nodes in the labeled knowledge graph are labeled with a natural language word or phrase.

18. The system of claim 15, wherein the concatenated natural language words or phrases includes a word or phrase used to label a link appended to an end of a word or phrase used to label a preceding node.

19. The system of claim 15, wherein the concatenated natural language words or phrases includes a word or phrase used to label a link prepended to a beginning of a word or phrase used to label a preceding node.

20. The system of claim 15, wherein each of the natural language input examples corresponds to a functionality provided by the application program.

* * * * *